United States Patent [19]

Süss

[11] Patent Number: 5,040,824
[45] Date of Patent: Aug. 20, 1991

[54] RESILIENTLY COMPLIANT SWIVEL BEARING FOR VEHICLE PARTS

[75] Inventor: Johann Süss, Korb, Fed. Rep. of Germany

[73] Assignee: Daimler-Benz Aktiengesellschaft

[21] Appl. No.: 508,289

[22] Filed: Apr. 13, 1990

[30] Foreign Application Priority Data

Apr. 15, 1989 [DE] Fed. Rep. of Germany ....... 3912399

[51] Int. Cl.$^5$ ............................ B60G 7/02; B60G 3/00
[52] U.S. Cl. ................................ 280/673; 267/141.2; 267/140.3; 267/153; 267/292; 280/95.1; 280/690; 280/691; 280/716
[58] Field of Search ...................... 280/716, 95.1, 670, 280/673, 690, 691, 675, 661, 701, 725, 671, 674, 688; 384/215, 220, 222; 403/228, 220, 221, 223, 225; 267/292, 293, 140.3, 153, 141.2, 141, 141.3

[56] References Cited

U.S. PATENT DOCUMENTS

| | | | |
|---|---|---|---|
| 4,444,415 | 4/1984 | Von der Ohe | 280/701 |
| 4,458,915 | 7/1984 | Emery | 280/675 X |
| 4,474,389 | 10/1984 | Van der Ohe | 280/725 X |
| 4,720,120 | 1/1988 | Shimatani et al. | 280/716 X |
| 4,744,587 | 5/1988 | Veneau | 280/690 |
| 4,822,073 | 4/1989 | Tanahashi et al. | 280/691 X |
| 4,832,364 | 5/1989 | Kikuchi et al. | 280/690 |
| 4,889,328 | 12/1989 | Uno et al. | 267/141.2 X |
| 4,943,082 | 7/1990 | Kijima et al. | 280/673 |
| 4,981,308 | 1/1991 | Kunert et al. | 280/661 |

FOREIGN PATENT DOCUMENTS

| | | |
|---|---|---|
| 0131795 | 1/1985 | European Pat. Off. . |
| 1465133 | 2/1977 | Fed. Rep. of Germany . |
| 3708037 | 10/1987 | Fed. Rep. of Germany . |
| 660560 | 11/1951 | United Kingdom . |
| 2018948 | 10/1979 | United Kingdom . |
| 2211271 | 6/1989 | United Kingdom . |

OTHER PUBLICATIONS

Patent Abstracts of Japan, M-422, Oct. 18, 1985, vol. 9/No. 261—"Vibrationproof Mechanism of Suspension Apparatus".

Primary Examiner—Douglas C. Butler
Attorney, Agent, or Firm—Evenson, Wands, Edwards, Lenahan & McKeown

[57] ABSTRACT

Resiliently compliant swivel bearings have particular resilience in one radial direction are used in vehicle construction, for example, for link mounting. An elastomeric spring element is firmly adhered between inner and outer bearing elements. Two diametrically opposite, elongate recesses passing axially through a space between the two bearing elements are molded into the springing element. Two radial webs remaining due to these molded recessed support upright forces, with the maximum radial resilience made possible by the recesses being selected so that the radial webs are not overloaded by shear stress. The outer bearing element is connected in resiliently compliant fashion, in each case adjacent to one of the elongate recesses of the springing element, to a carrier which can be secured on a vehicle part in order to impart to the inner and outer bearing elements a radial resilience greater than the maximum possible radial deflection of the inner bearing element relative to the outer bearing element.

1 Claim, 1 Drawing Sheet

RESILIENTLY COMPLIANT SWIVEL BEARING FOR VEHICLE PARTS

BACKGROUND AND SUMMARY OF THE INVENTION

The present invention relates to a resiliently compliant swivel bearing for vehicle parts, in particular for wheel suspension members of independently suspended vehicle wheels, and more specifically, to a vehicle swivel bearing having two-sleeve shaped bearing elements and radial clearance one inside the other and each held on different vehicle parts.

In vehicle construction, swivel bearing of the type shown in EP-OS 131,795 and JP-OS 60-107405 are usually used for resiliently compliant mounting and/or support of vehicle parts.

This known swivel bearing has two bearing elements, which are arranged one inside the other and formed by cylindrical sleeves. The elements are connected to one another by two resilient radial webs formed by elongate or kidney-shaped recesses molded into a rubber springing element.

In this conventional arrangement, the radial paths of the inner sleeve which are possible due to the elongate recesses are to be matched to the length and cross-sections of the radial webs in such a way that, in the case of maximum radial deflections of the sleeve, the webs are not overloaded by shear stress.

Since, however, in order to achieve the required radial paths, it has not been possible to design such swivel bearing with an arbitrarily large diameter, compromises must be made in construction of the swivel bearings.

The situation is essentially the same in the case of a swivel bearing constructed as shown in DE-OS 3,708,037. The elastomeric spring element is firmly adhered between two bearing elements and into which diametrically opposite elongate recesses pass axially through the space between the bearing elements and leave radial webs between the recesses. The outer bearing element is held adjacent one of the recesses of the springing element on a carrier element which can be secured to the vehicle part concerned.

It is, therefore, an object of the invention to improve a swivel bearing such that, in the direction in which its inner sleeve exhibits its greatest radial displaceability, a radial resilience which is greater than the maximum possible radial deflection of the bearing sleeve in the outer bearing element is imparted to the bearing.

This object has been achieved in accordance with the present invention by connecting the outer bearing element in a resiliently compliant manner to the carrier element.

The swivel bearing construction in accordance with the present invention has the feature of in-line springing means, of which those situated outside the outer bearing element make possible an additional radial movement of the bearing which is performed jointly by both bearing elements.

The swivel bearing is particularly suitable for the swivellable articulation of a wheel suspension link or, if required, of an axle assembly on the body of a motor vehicle, offering an additional advantage of a particularly effective decoupling of noise.

In the case of a wheel suspension link, the present invention makes it possible to mount a transverse link of an independent wheel suspension in such a way that, while the track is substantially retained when driving over obstacles, greater driving comfort is achieved by impact damping. This is accomplished, for example, by cooperation of the transverse link mounted by the swivel bearing so as to be movable on one side of the correspondingly large radial paths, with a drag link engaging on the wheel carrier. The drag link, given appropriate matching of the wheel suspension, allows a longitudinal compliance of the wheel carrier to be achieved which the track alters as little as possible.

BRIEF DESCRIPTION OF THE DRAWINGS

These and other features, objects and advantages will become more apparent from the following detailed description of a presently preferred embodiment of the present invention when taken in conjunction with the accompanying drawing wherein.

DETAILED DESCRIPTION OF THE DRAWINGS

Figure 1:
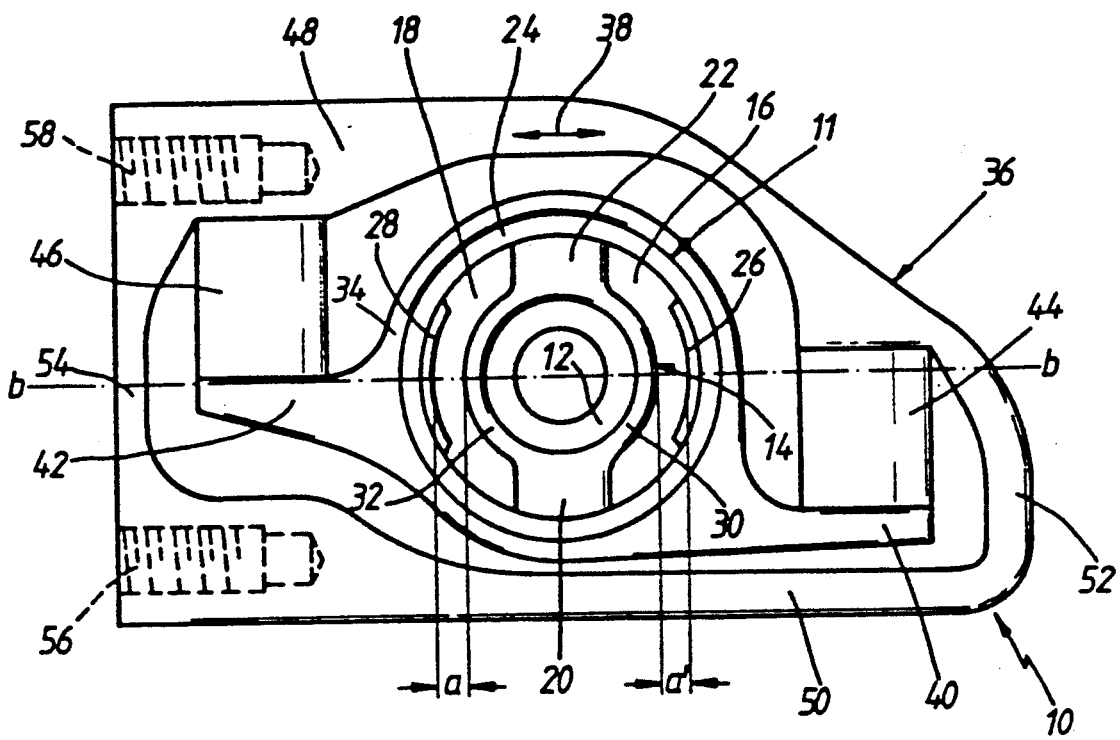
FIG. 1 is a side elevational view of a swivel bearing according to the present invention.

In FIG. 1, a swivel bearing according to the present invention is designated generally by the numeral 10, and has an outer bearing element 11 in which an inner bearing element 12 in the form of a cylindrical bearing sleeve is held with radial clearance so as to be radially moveable. A springing element 14, preferably made of rubber, is provided between the two bearing elements 11 and 12, and is firmly adhered to the bearing element 12 by vulcanization.

Elongate recesses 16, 18 are diametrically opposite to each other and extend axially in the space between the bearing elements 11 and 12. These recesses 16, 18 are molded in a kidney-shaped into the springing element 14 and are bounded by the outer bearing element 11. Diametrically opposite connecting webs 20, 22 are provided between the recesses 16, 18 and establish a radial connection between the two bearing elements 11, 12.

The arrangement of the recesses 16, 18 permits equal radial deflections a, a' of the inner bearing element 12 in the outer bearing element 11.

The outer bearing 11 is formed by a cylindrical bush 24 to which the springing element 14, or to the inner circumference of which the connecting webs 20, 22, are vulcanized. Rubber buffer rests 26, 28 limit the radial path a, a', respectively, and, to together with rubber layers 30, 32 of the springing element 14 on the outer circumference of the sleeve-shaped inner bearing element 12, dampingly limit the radial paths a, a'. The buffer rests 26, 28 are molded onto the inner circumference of the bush 24 in the central region of the kidney-shaped recesses 16, 18.

The bearing element is inserted into a cylindrical opening of an accommodating member 34 which is elastically suspended preferably inside a carrier 36 secured on a vehicle part. The elastic suspension of the member 34 is effected adjacent the kidney-shaped recesses 16, 18.

In the illustrated embodiment shown in FIG. 1, this connection is such that, at least in the direction of the greatest radial compliance of the springing element 14 shown by a double arrow 38, the outer and inner bearing element 11, 12 can be jointly displaced accordingly.

For this joint displacement, two oppositely disposed projections 40, 42 adjacent to each of the kidney-shaped recesses 16, 18 protrude from the accommodating member 34. Each of the projections 40, 42 is connected to a resiliently compliant connecting member 44, 46 held by the carrier 36.

Depending on how the swivel bearing 10 is used, however, it may be sufficient to connect the outer bearing element 11 or its accommodating member 34 to the carrier element in such a way that the outer bearing element 11 or the accommodating member 34 can only be displaced in the radial direction relative to the carrier 36 in accordance with the double arrow 38. The association of the two connecting members 44, 46 with the springing element 14 is such that they provide support for radial forces in the direction of the connecting webs 20, 22.

For radially compliant accommodation of the outer bearing element 11 in the carrier 36, the latter preferably has a frame-shape. The two connecting members 44, 46 are preferably made of rubber and are held on a longitudinal frame limb 48 of the carrier 36. The outer bearing element 11 is thus, in this example, suspended in the carrier element 36. Alternatively, it is also within the scope of the present invention to connect the outer bearing element 11 to both the upper longitudinal frame limb 48 and to the lower longitudinal frame limb 50.

Both connecting members 44, 46 form springing elements which are preferably of the same dimensions and are of cuboid shape. In order to limit the possible radial path of the outer bearing element 11 in the carrier 36, the transverse frame limbs 52, 54 of the carrier simultaneously act as stops and as buffer rests for impact damping. Apart from tilting movements, the connection of the outer bearing element 11 inside the frame-shaped carrier 36 provides both a translatory displacement of the outer bearing element 11 in mutually perpendicular directions and also a moment-free introduction of supporting forces.

As FIG. 1 shows, the resilient connecting members 44, 46 can be secured within the frame-shaped carrier 36 at various distances from a horizontal plane, b—b, lying in the center of the bearing 10 by positioning the projections 40, 42 with a corresponding offset relative to one another. Due to the frame-shaped carrier 36, the swivel bearing 10 can be advantageously used where space is limited without the necessity to compromise from the initial design as regards the desired radial compliance. One of the frame limb 54 can form a base for securing the bearing 10 on a vehicle part. For this purpose, the limb 54 is equipped, for example, with two threaded bores 56, 58.

Figure 2:
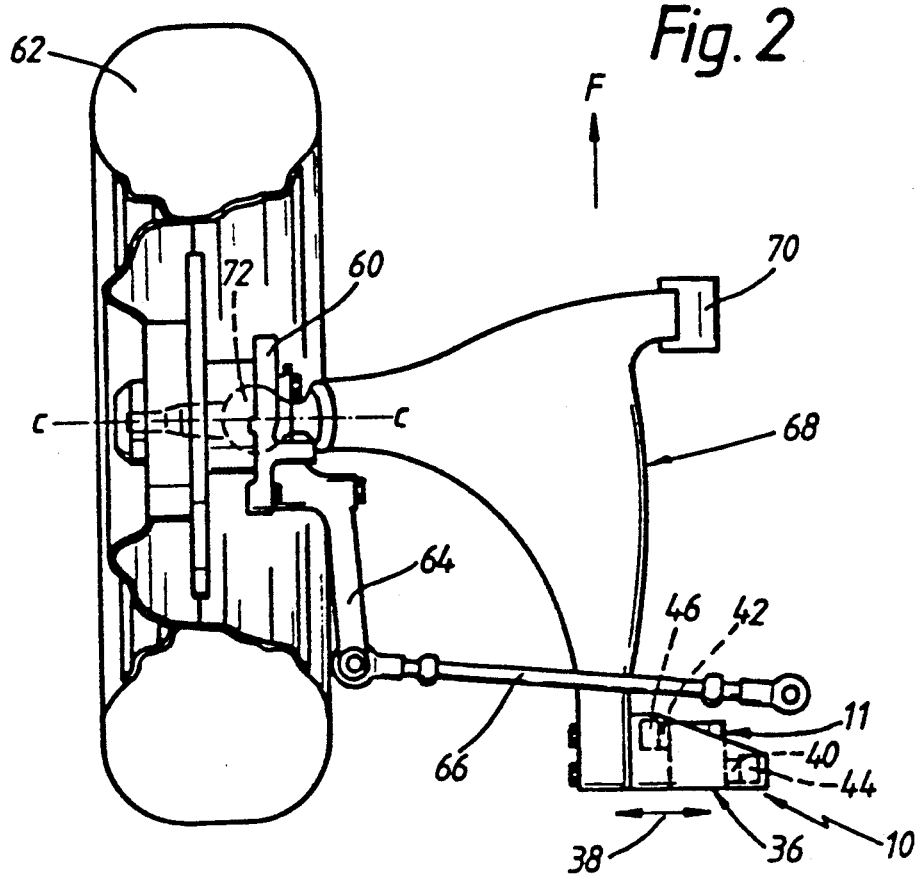
FIG. 2 is a schematic plan view of an independent wheel suspension equipped with a swivel bearing according to FIG. 1, with only one transverse link, one drag link and one wheel carrier being represented as wheel suspension members.

FIG. 2 shows the exemplary use of the swivel bearing 10 as part of an independent wheel suspension. A wheel carrier 60 is provided for mounting a vehicle wheel 62, which is, for example, steerable; for this purpose, the wheel carrier 60 is equipped with a steering arm 64, on which a drag link 66 is articulated. A transverse link 68 is mounted swivellably on the vehicle body (not shown) by two link bearings arranged one behind the other with spacing. The depiction of other wheel-guiding components of the wheel suspension has been dispensed with since they are not necessary to an understanding of how to make and use the present invention.

The forward link bearing 70 in the travel direction F is a known rubber/metal bearing. The other link bearing is formed by the swivel bearing 10 in accordance with the present invention, the carrier 36 of which is secured on the transverse link 68 in such a way that the outer and inner bearing elements 11, 12 have the greatest radial compliance transverse to the travel direction F as shown by double arrow 38. Accordingly, given a suitable torsional flexibility of the inner bearing element 12, a support of high forces is effected via the connecting webs 20, 22 and the connecting members 44, 46.

The arrangement of the swivel bearing 10 is dependent on the selected position of the ideal vertical swivelling axis of the transverse link 68. As seen in the travel direction F, the swivel bearing 10 can therefore form the rearward or forward link bearing. The transverse link 68 is articulated at the bottom on the wheel carrier 60 via a ball head 72.

Due to the great radial resilience of the swivel bearing 10 in the transverse direction of the vehicle, an angular mobility of the transverse link 68 about a vertical axis is made possible. Depending on the matching of the bearing hardnesses of the two link bearings 10, 70, the vertical axis can lie between the two bearing or within the link bearing 70. It has thereby been achieved that, given appropriate dimensioned matching and mutual association of the drag link 66, the steering arm 64 and the transverse link 68, a longitudinal compliance of the wheel carrier 60 offering a greater driving comfort is established relative to the wheel axis, c—c, when driving over obstacles on the carriageway, while longitudinal compliance of the track is substantially retained.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A resiliently compliance swivel bearing for vehicle parts, particularly for wheel suspension members of independently suspended vehicle wheels, comprising two sleeve-shaped bearing elements arranged with radial clearance one inside the other and each operatively associated with separate vehicle parts, and an elastomeric spring element firmly adhered between the two bearing elements and into which elongate recesses lying diametrically opposite to one another are molded and pass axially through the clearance between the bearing elements so as to leave radial webs between the elongate recesses, the outer of the bearing element being held at each of the recesses of the spring element on a carrier which can be secured on one of the vehicle parts, wherein the outer bearing element has a cylindrical bush inserted into a cylindrical opening of an accommodating member having projections, the carrier is frame-shaped, the accommodating member is suspended in the carrier via connecting members, by the projections extending from the accommodating member and transversely to and on opposite sides of a one bearing axis and secures to a respective one of the connecting members.

* * * * *